United States Patent [19]
Gray

[11] 3,803,484
[45] Apr. 9, 1974

[54] METHOD AND APPARATUS FOR MEASURING DETERIORATION IN A SHIELDED CABLE BY HIGH FREQUENCY PULSE INJECTION

[75] Inventor: Robert F. Gray, Arlington, Va.

[73] Assignee: The United States of America as represented by the Secretary of the Army, Washington, D.C.

[22] Filed: Nov. 30, 1972

[21] Appl. No.: 310,732

[52] U.S. Cl. ................................... 324/54, 324/51
[51] Int. Cl. .................... G01r 31/02, G01r 31/12
[58] Field of Search ............ 324/51, 52, 54, 58.5 A, 324/58 A, 127

[56] References Cited
UNITED STATES PATENTS

| | | | |
|---|---|---|---|
| 2,176,756 | 10/1939 | Borden | 324/52 |
| 2,176,757 | 10/1939 | Borden | 324/52 |
| 2,362,372 | 11/1944 | Halfmann | 324/54 UX |
| 2,439,940 | 4/1948 | Lewis | 324/54 |
| 2,752,590 | 6/1956 | Towle | 324/54 X |
| 2,832,042 | 4/1958 | Lambert | 324/52 |

*Primary Examiner*—Gerard R. Strecker
*Attorney, Agent, or Firm*—Edward J. Kelly; Herbert Berl; Saul Elbaum

[57] ABSTRACT

A generator injects a current pulse to a coaxial driver that is slipped over one end of a shielded cable undergoing test. The current pulse is divided between the cable shield and the cable bundle. A capacitive trough is positioned along an intermediate length of the cable, adjacent the cable shield, and serves as a high-frequency current return. Remaining low frequency current is returned through the total length of the cable. Instrumentation is provided to compare the ratio of the internal bundle current to the external shield current with known standards, over a frequency spectrum thereby permitting the detection of connector and cable deterioration.

6 Claims, 1 Drawing Figure

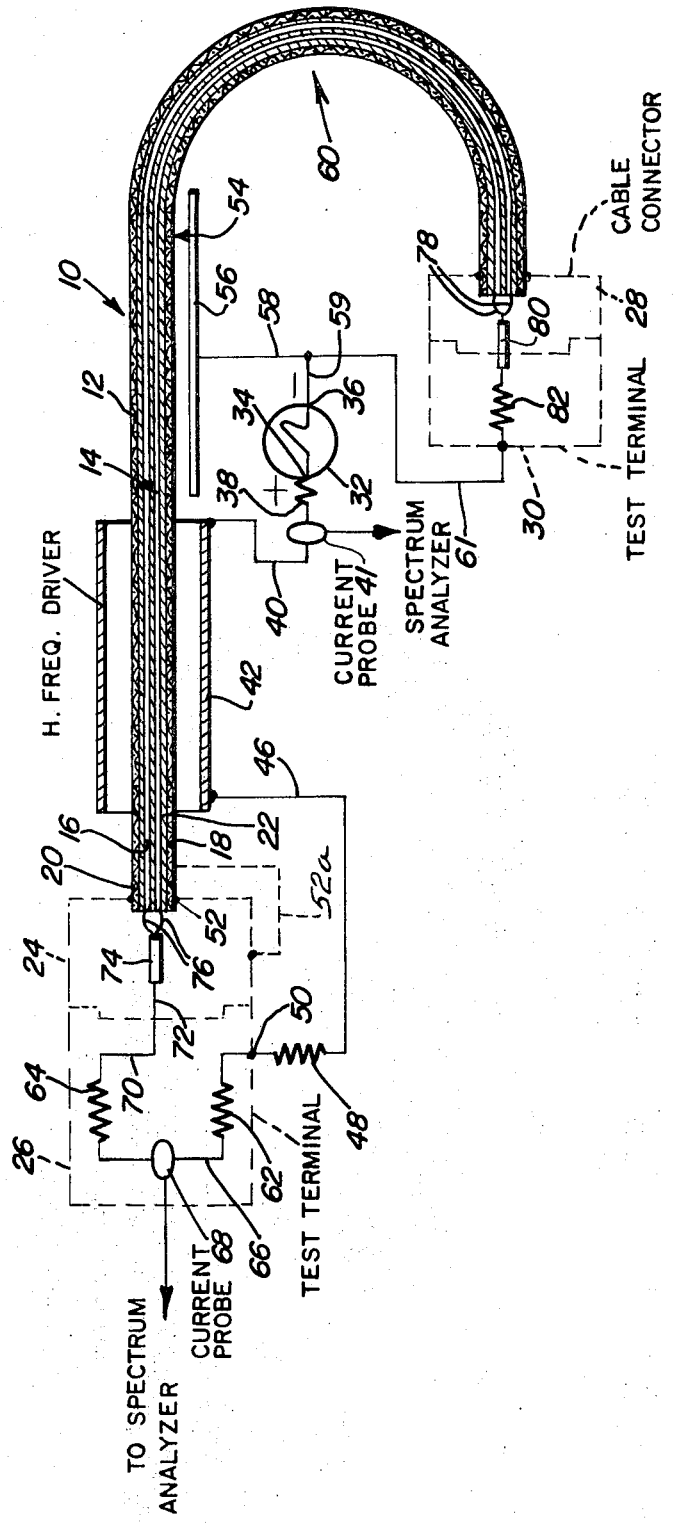

3,803,484

METHOD AND APPARATUS FOR MEASURING DETERIORATION IN A SHIELDED CABLE BY HIGH FREQUENCY PULSE INJECTION

RIGHTS OF THE GOVERNMENT

The invention described herein may be manufactured, used, and licensed by or for the United States Government for governmental purposes without the payment to us of any royalty thereon.

FIELD OF THE INVENTION

The present invention relates to cable testers and more particularly to testers that determine deterioration in a cable or its attached connectors by using high frequency pulse injection.

BRIEF DESCRIPTION OF THE PRIOR ART

Testers for cables are old in the art. The classical tester includes a source of DC current that impresses DC energization along the length of the cable. Individual conductors can be tested for open circuits while testing between conductors can determine short circuits in the cable.

Although this approach is satisfactory for determining ultimate faults in the cable, it does not furnish a solution to the testing of cable and connector deterioration. This is due to the fact that the resistance along shielding, cable bundles, and connectors is extremely low. Accordingly, DC measurements are insensitive to deterioration that does not substantially effect resistance.

Chronologically, as radar and other high frequency (R.F.) applications developed, it became increasingly important to check cables and their connectors for deterioration with time. This is due to the fact that deterioration can cause losses of R.F. energy. Thus, if one wishes to test an R.F. cable connected between a transmitter-receiver and an antenna, the extent of normal operating losses at a particular frequency can be determined by measuring input current at a particular frequency and output current at that frequency. However, this approach still does not shed light on the extent of cable or connector deterioration.

BRIEF DESCRIPTION OF THE PRESENT INVENTION

The present invention realizes the need for testing cables and connector deterioration, as well as the ultimate faults of short circuits and open circuits in a cable. The present tester compares the energy coupled into the internal conductor bundle of the cable with energy transmitted down the external cable shield. Degradation of the cable bundle or the cable shield will cause an increased amount of energy to be coupled into the internal bundle. Normally, with a good cable, most current will travel through the cable shield due to its lower impedance.

With the testing system procedure of the present invention, a relatively wide frequency of response can be monitored. The high frequency characteristics of a particular cable are determined by injecting a high frequency pulse along the bundle and the shield of the cable. A capacitive trough is positioned along an intermediate length of a tested cable to provide a high frequency current return from the shield. The remaining low frequency portion of the shield travels the extent of the cable shield length.

Spectrum analysis of the ratio of bundle current to shield current defines the entire transfer function of the cable.

Once an actual transfer function curve is developed for a particular cable undergoing testing, this transfer function curve may be compared to that of a standard curve with the deviation being attributable to cable deterioration.

The above-mentioned objects and advantages of the present invention will be more clearly understood when considered in conjunction with the accompanying drawings, in which:

BRIEF DESCRIPTION OF THE FIGURE

The FIGURE is a schematic representation illustrating the connection of a cable and its connectors to the test instrumentation that forms the present invention.

DETAILED DESCRIPTION OF THE INVENTION

Reference numeral 10 generally indicates a cable that is to undergo testing for deterioration or faults. The cable is the standard R.F. cable having a shield 12 coaxially surrounding a conductor bundle generally indicated by reference numeral 14. Bundle 14 is typified by two insulated conductors 16 and 18 having insulating sleeves 20 and 22 therearound. A connector 24 is shown to be connected at the left-end of the cable while a second connector 28 is shown to be connected to the right side of the cable. Prior to testing the cable, it is fashioned in a J-shape, the loop of this shape insuring wide frequency band width response which is required for the reasons to become hereinafter clear.

To test the cable 10, it is removed from its normal connection between equipment (not shown). The pins (not shown) of the connectors 24 and 28 are then shorted with jumper wires or the like. Thus, the individual conductors of the bundle 14 are short circuited together at both ends.

A high frequency pulse generator 32 has its positive terminal 34 connected to a lead 40 through a shaping resistor 38 which dampens oscillations. A current probe 41 is inductively coupled to the lead 40 and measures the input current. The probe may be of a type manufactured by Tektronix, Inc. The lead 40 transmits pulse injection to a high frequency coaxial driver 42 that resembles a tube, and may be twelve feet in length for typical R.F. cable lengths. The driver 42 high frequency energy content of the pulse through lead 46, that is connected at 50 to the terminal 26 through a coaxial transmission line termination resistor 48. Inasmuch as the terminal box 26 and the connector 24 are made of conductive material, the current flowing through resistor 48 is conducted to the shield 12 at point 52. This current nearly equals the input current because of the relatively low input impedance of the shielding. The flow between connector 24 and point 52 is due to the normal electrical connection by clamping of the cable shield 12 to the connector 24. The current flow path to point 52 is indicated by the equivalent connection 52a.

As the current is transmitted down the shield 12, it reaches a region 54 that has a capacitive trough 56 placed adjacent thereto. This capacitive bypass serves as a high frequency energy return to the pulse generator 32. This return path is generally indicated by 58. The remaining current in the shield 12 is transmitted around the bend 60, this energy being of a low frequency nature. Inasmuch as the connector 28 is electrically connected between the shield 12 and the test terminal 30, this remaining low frequency current is returned to the pulse generator 32 via lead 61.

As is clearly shown in the figure, current from a resistor 48 is divided between the shield 12 and a second parallel path including balanced terminal resistors 62 and 64 that are connected in series, within the terminal box 26. The total resistance of resistors 62 and 64 equals the resistance of resistor 82. The resistors are connected together by a lead 66 which permits the introduction of a second current probe 68 therealong. The current probe 68 is identical to that previously discussed in connection with current probe 41, except that it measures bundle current. When current flows through resistor 64, it is coupled to the cable bundle 14 by connecting lead 70 which is connected to a lead 72. It should be understood that the lead 72 is, in actuality, a pin-socket affair that permits sliding removal and insertion of the connector 24 in the terminal box 26. Reference numeral 74 indicates a node point for shorting the individual conductor ends 76 of the conductors 16 and 18.

The cable bundle current will conduct along the conductors 76 until it passes outwardly from the conductor ends 78 on the opposite end of the cable. In a similar fashion, a node point 80 is provided to connect the conductor ends 78 in a shorting fashion. Again, the connector 28 and the test terminal 30 must be adapted to allow the sliding removal and insertion of these components.

The termination resistor 82 connects the node point 80 with the lead 61 that conducts the current from the cable bundle conductors back to the negative terminal 36 of the generator 32.

In order to determine whether cable deterioration is evidenced in the cable 10 undergoing testing, the following novel technique must be employed.

The output signals from the current probes 68 and 41 are transformed from the time domain to the frequency domain by a spectrum analyzer such as manufactured by Hewlett Packard, Inc. A spectrum analyzer, such as of this type, reduces the bundle current and the shield current to a plot of amplitude as a function of frequency. The fraction of bundle current divided by shield current defines the transfer function of the cable. At a particular frequency, the bundle current divided by the shield current is a unitless number. The transfer function curve as a function of frequency can be plotted for the cable 10, undergoing testing. This plot is then compared to a standard plot that has been previously made for a known, good cable of the same type, length, and same number of conductors.

By comparing the transfer function curve of the tested cable and the standard cable, the deviation between the curve manifests the degree of deterioration in the cable or the connectors.

It is important to obtain the ratio of bundle current to shield current because the shield current nearly equals the current injected by the pulse generator 32. Therefore, the ratio makes the measurements more sensitive and the degreee of deterioration can be determined accurately and precisely. This is due to the fact that deterioration will cause an increased current flow through the bundle at certain frequencies which affects the ratio.

According to the above specification, it will be apparent that both the apparatus and procedure outlined offers great advantages in the testing of a cable and its connectors. Because there is no great dependence upon electrical components, the present invention can be housed in the two test terminal boxes 26 and 30. For this reason, the present tester is extremely portable and compact. This lends itself to use in the field. It should also be mentioned that after the connector 24 undergoes testing the cable is removed from the terminal boxes 26 and 30 and reverse-connected to permit deterioration testing of connector 28.

It should be understood that the invention is not limited to the exact details of construction shown and described herein for obvious modifications will occur to persons skilled in the art.

Wherefore I claim the following:

1. A method for testing a shielded cable consisting of the steps of:
    subjecting the shield of the cable and the internal conductors thereof to an input current pulse;
    measuring the conductor current amplitude as a function of frequency;
    measuring the input current amplitude as a function of frequency;
    forming a ratio relationship between conductor current and input current at particular frequencies thereby defining the cable transfer function; and
    comparing the transfer function of the tested cable with that of known standard cable, deviations between the transfer functions being determinative of cable deterioration.

2. A system for testing a shielded cab having connectors at opposite ends thereof, the system comprising:
    means for generating an input current pulse;
    conductor means for conducting the input current pulse to at least one internal conductor and the cable shield via a first connector;
    means for separately measuring the input current and the current flowing through the internal conductor as a function of frequency to enable the determination of the ratio of internal conductor current to input current for particular frequencies thereby defining a cable transfer function to be compared with a standard cable function; and
    means for completing a return circuit path from the internal conductor and the shield, via a second connector to the generating means;
    deviations between the transfer functions being indicative of cable deterioration.

3. The structure of claim 2 wherein the cable includes a plurality of internal conductors to form a cable bundle, and further wherein means are provided to short circuit the individual conductors at both ends of the bundle to enable parallel conduction of current through the individual conductors.

4. The structure as defined in claim 2 wherein a high frequency driver is coaxially mounted over a cable end, the driver being connected between the generator and the cable shield.

5. the structure of claim 2 together with a capacitive trough located adjacent an intermediate length of the cable shield; and
    means for connecting the trough to the generator to complete a high frequency current bypass to the generator, the remaining low frequency current being conducted along the entire length of the shield and the conductor.

6. The subject matter defined in claim 2 wherein the cable is looped while undergoing testing to improve the wide frequency bandwidth of current conduction through the cable.

* * * * *